US008693698B2

(12) United States Patent
Carnes et al.

(10) Patent No.: US 8,693,698 B2
(45) Date of Patent: Apr. 8, 2014

(54) METHOD AND APPARATUS TO REDUCE NON-LINEAR DISTORTION IN MOBILE COMPUTING DEVICES

(75) Inventors: Michael Carnes, San Francisco, CA (US); Jerome Tu, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1046 days.

(21) Appl. No.: 12/112,792

(22) Filed: Apr. 30, 2008

(65) Prior Publication Data

US 2009/0274315 A1    Nov. 5, 2009

(51) Int. Cl.
*H04B 3/20* (2006.01)
*H04M 9/08* (2006.01)

(52) U.S. Cl.
USPC ............... 381/66; 379/406.08; 370/286

(58) Field of Classification Search
USPC ............... 381/66; 379/406.01–406.16
See application file for complete search history.

(56) References Cited

U.S. PATENT DOCUMENTS

| | | | |
|---|---|---|---|
| 5,323,458 A | 6/1994 | Park et al. | |
| 5,796,819 A * | 8/1998 | Romesburg | 379/406.09 |
| 6,317,501 B1 * | 11/2001 | Matsuo | 381/92 |
| 6,404,886 B1 * | 6/2002 | Yoshida et al. | 379/406.01 |
| 6,999,582 B1 * | 2/2006 | Popovic et al. | 379/406.01 |
| 7,003,099 B1 * | 2/2006 | Zhang et al. | 379/406.03 |
| 2002/0015500 A1 | 2/2002 | Belt et al. | |
| 2002/0097864 A1 * | 7/2002 | Ljungberg et al. | 379/406.01 |
| 2002/0131580 A1 * | 9/2002 | Smith | 379/387.01 |
| 2002/0181567 A1 * | 12/2002 | Hamdi | 375/222 |
| 2003/0202654 A1 * | 10/2003 | Xiong | 379/406.01 |
| 2005/0281415 A1 * | 12/2005 | Lambert et al. | 381/92 |
| 2006/0188089 A1 * | 8/2006 | Diethorn et al. | 379/406.01 |
| 2007/0076899 A1 * | 4/2007 | Hsu | 381/92 |
| 2007/0205932 A1 * | 9/2007 | Inoue et al. | 341/144 |

FOREIGN PATENT DOCUMENTS

JP    2008060715 A    3/2008

* cited by examiner

*Primary Examiner* — Daniel Luke
*Assistant Examiner* — Khaja Ahmad
(74) *Attorney, Agent, or Firm* — Kilpatrick Townsend and Stockton LLP

(57) ABSTRACT

Techniques to reduce distortion in acoustic signals in mobile computing devices are described. For example, a mobile computing device may comprise a speaker operative to receive a first signal and output a second signal. The mobile computing device may further comprise a first microphone operative to receive the second signal and a second microphone operative to receive a third signal. An echo canceller may be coupled to the first microphone and the second microphone and may be operative to compare the second signal and the third signal and reduce distortion in the third signal based on the comparison. Other embodiments are described and claimed.

19 Claims, 5 Drawing Sheets

METHOD AND APPARATUS TO REDUCE NON-LINEAR DISTORTION IN MOBILE COMPUTING DEVICES

BACKGROUND

As mobile computing devices continue to evolve, the demand for high quality audio reproduction continues to increase. Acoustic echo is a common problem in mobile computing devices that reduces the quality of acoustic audio reproduction. Conventional echo cancellation techniques utilize linear models that often fail to completely remove or adequately reduce the necessary echo components from the signal received at the primary microphone of the mobile computing device. The reason for the degraded performance of the conventional techniques is often distortion introduced by the speaker element of the mobile computing device. The distortion introduced by the speaker may be non-linear, and therefore may not be handled by conventional linear echo canceller algorithms and models. It is desirable, therefore, for mobile computing devices to include a second microphone configured to capture the output of the speaker, including any distortion or inaccuracy introduced by the speaker, and use this signal to reduce non-linear distortion in the audio signal received at the primary microphone. Consequently, there exists a substantial need for techniques to improve non-linear distortion reduction in mobile computing devices.

DETAILED DESCRIPTION

Figure 1A:
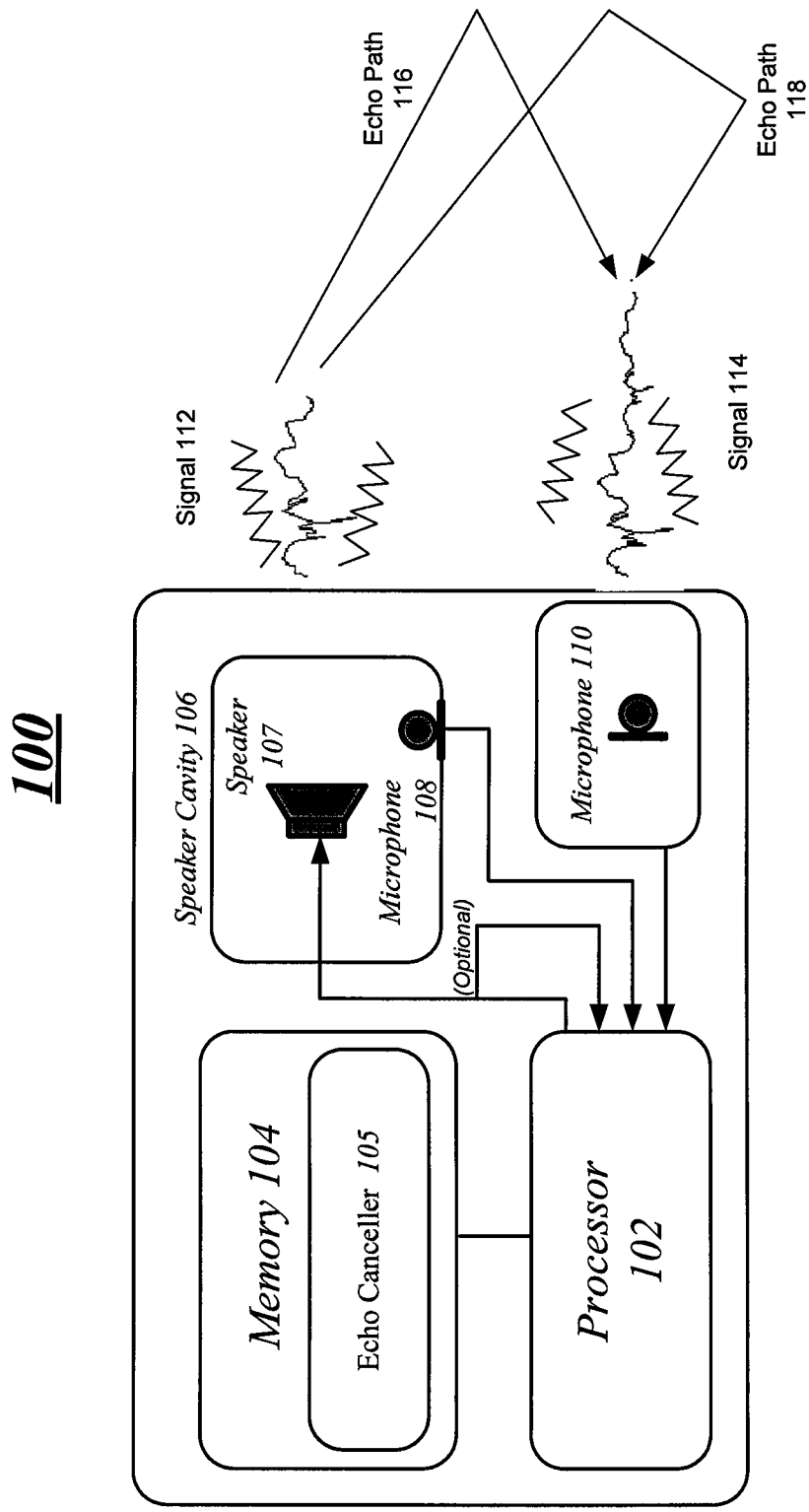
FIG. 1A illustrates one embodiment of a first mobile computing device.

Acoustic echo is a common problem in mobile computing devices. Conventional echo cancellation techniques often fail to completely remove the necessary echo components from the received audio signal. Conventional echo cancellation techniques take as inputs the signal going into a speaker and the signal received from a microphone. The conventional techniques then attempt to cancel any echo embedded in the microphone signal based on a comparison of the signal sent to the speaker and the signal received at the microphone. These conventional techniques utilize a linear model of the echo environment, treating the propagation channel as a linear system with an estimated impulse response. Conventional algorithms do not, however, model non-linear distortion that may be introduced by the speaker of the mobile computing device. The focus on linear echo cancellation results in degraded performance due, in part, to the distortion introduced by the speaker, which may be non-linear in nature and therefore not handled by linear echo cancellation algorithms.

In the event that a speaker is over driven or is simply inadequate to accurately reproduce the desired acoustic signal, the sent signals will have non-linear distortion introduced by the speaker prior to the signal entering the echo environment. As a result, the signal received at the primary microphone of the mobile computing device will contain linear distortion introduced by the echo environment in which the mobile computing device is being used and non-linear distortion of the original signal introduced by the speaker. In this situation, the linear model of convention echo cancellation techniques is inadequate. The non-linear distortion components remain embedded in the signal and are potentially heard by a far-end user as an annoying echo.

Conventional echo cancellers may contain proprietary non-linear algorithms to handle the non-linear distortions introduced by echo environments. Many of these non-linear algorithms rely on attenuating or even muting the microphone path completely, reducing or eliminating the reception of non-linear distortion, but also reducing or removing the desired user voice signal from the microphone. Consequently, there exists a substantial need for techniques to improve non-linear distortion reduction in mobile computing devices.

While conventional mobile computing devices may utilize a plurality of microphones for location modeling, distance determinations, beam forming etc., these conventional devices have not traditionally used the plurality of microphones for non-linear echo cancellation as described herein. Various embodiments may be generally directed to non-linear distortion reduction for a mobile computing device, such as a smart phone. Some embodiments may be particularly directed to methods and apparatus to reduce non-linear distortion in mobile computing devices.

In one embodiment, for example, a mobile computing device may include a speaker cavity, speaker, first microphone, second microphone and an echo canceller. In various embodiments, the echo canceller may be coupled to the first microphone and the second microphone and may be operative to compare the signal from the second microphone and the signal from the first microphone to reduce distortion in a received acoustic signal.

The mobile computing device may further include a processor coupled to the speaker, first microphone and second microphone. The processor may be operative to execute the echo canceller. The mobile computing device may further include a memory coupled to the processor. The memory may be operative to store the echo canceller. Other embodiments are described and claimed.

Reducing the amount of non-linear distortion received at a mobile computing device may have several advantages. For example, if a user involved in a telephone conversation using their mobile computing device increases the volume of the device, the speaker of the mobile computing device may be over driven. In this situation, it would be advantageous for the mobile computing device to detect the distortion introduced by the over driven speaker and reduce the distortion in the received audio signal at the primary microphone to avoid any disruption in the telephone call quality experienced by the user. Utilizing a secondary microphone in close proximity to the speaker may allow the mobile computing device to capture and reduce non-linear distortion introduced by the speaker and enhance the performance and user experience of the mobile computing device.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1A illustrates one embodiment of an apparatus. In particular, FIG. 1A shows a first embodiment of a mobile computing device 100. The mobile computing device 100 may include by way of example and not limitation a processor 102, a memory 104, an echo canceller 105, a speaker cavity 106, a speaker 107, a microphone 108 and a microphone 110. While only one speaker and two microphones are illustrated in FIG. 1A by way of example, it should be understood that one or more speakers and two or more microphones may be used and still fall within the described embodiments. These elements or portions of these elements may be implemented in hardware, software, firmware, or in any combination thereof. The embodiments are not limited to these depicted elements.

The mobile computing device 100 may be generally configured to support or provide cellular voice communication, wireless data communication and computing capabilities. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, cordless phone, wireless headset, wired headset, VoIP phone and so forth. Additional details for a mobile computing device may be described in more detail with reference to FIG. 4.

The processor 102 may comprise a general purpose processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, e-mail, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 104 may comprise computer-readable media such as volatile or non-volatile memory units arranged to store programs and data for execution by the processor 102. As depicted in FIG. 1A, the memory 104 may store an echo canceller 105 in the form of executable program instructions, code or data. The processor 102 may retrieve and execute the program instructions, code or data from the memory 104 to provide echo cancellation or distortion reduction operations for the mobile computing device 100. Although the echo canceller 105 is shown as part of the memory 104 for execution by the processor 102, it may be appreciated that the echo canceller 105 may be stored and executed by other memory and processing resources available to the mobile computing device 100. Further, although the echo canceller 105 is depicted as software executed by a processor, it may be appreciated that the operations for the echo canceller 105 may be implemented in hardware as well using one or more integrated circuits, for example. The embodiments are not limited in this context.

Speaker 107 may comprise one or more electromechanical transducers that convert an electrical signal to sound. Speaker 107 may be configured to provide stereophonic or monophonic sound, for example. In various embodiments, speaker 107 may comprise one or more speakers. In various embodiments, a first speaker may be configured for a close range audio mode and a second speaker may be configured for a speakerphone audio mode. In various embodiments, the first or second speaker may be located remote from the mobile computing device 100. For example, the first or second speaker may be located in a Bluetooth headset or hands-free car kit communicably coupled to mobile computing device 100.

The microphones 108 and 110 may comprise any acoustic-to-electric transducer or sensor that converts sound into an electrical signal. In various embodiments, microphones 108 and 110 may comprise dynamic microphones, condenser microphones, or any other type of microphone suitable for use in converting audio signals into electrical signals to be processed by mobile computing device 100. While microphones 108 and 110 are shown as part of mobile computing device 100 by way of example, it should be understood that microphones 108 and 100 may comprise a microphone that is not part of mobile computing device 100 in various embodiments. In various embodiments, either of microphones 108 or 110 may comprise a microphone that is located remote from mobile computing device 100 and is communicably coupled to mobile computing device 100. For example, microphone 110 may comprise a microphone that is part of a Bluetooth headset or hands-free car kit communicably coupled to mobile computing device 100. Other embodiments are described and claimed.

Speaker cavity 106 may comprise a housing or hollow area defined within mobile computing device 100. In various embodiments, speaker cavity 106 is configured to secure and protect speaker 107. Speaker cavity 106 may be configured with at least one side that contains openings to allow acoustic signals to escape the cavity and mobile computing device 100 in various embodiments. For example, speaker cavity 106 may have one side that contains holes, slots or any other openings suitable for allowing acoustic signals to escape the cavity. The openings should be sized such that foreign objects cannot easily penetrate the speaker cavity and cause damage to speaker 107.

In various embodiments, microphone 108 may be located within speaker cavity 106 along with speaker 107. In some embodiments, microphone 108 may be located outside of speaker cavity 106 and still fall within the described embodiments. Speaker cavity 106 may be located within mobile computing device 100 in various embodiments. In one embodiment, speaker cavity 106 may be located outside of mobile computing device 100. For example, speaker cavity 106 may be located within a Bluetooth headset device that is communicably couple to mobile computing device 100. Other embodiments are described and claimed.

In general operation, the mobile computing device 100 may comprise a speaker 107. Speaker 107 may be operative to receive a first signal and output a second signal in some embodiments. The first signal may comprise an electrical source signal and the second signal may comprise the electrical source signal after it has been converted to an acoustic signal plus any distortion, inaccuracy or non-linearity introduced by speaker 107. In some embodiments, the distortion introduced by speaker 107 comprises non-linear distortion created when speaker 107 forms the second signal. For example, if the amplitude of the first signal is such that speaker 107 will be over driven or speaker 107 is insufficient to handle the first signal, non-linear distortion will be created when speaker 107 forms the second signal.

The non-linear distortion associated with the second signal may also be formed due to inaccuracies in the acoustic reproduction of the electrical source signal by speaker 107 in some embodiments. Non-linear distortion may comprise, for example, new or additional frequency components and phase shifts that were not present in the original signal and were not introduced by a linear system, such as an echo environment. Non-linear distortion may comprise, for example, clipping due to the speaker being over driven, buzzing resulting from the speaker coming into contact with the speaker cavity or other mechanical components, phase or other harmonic distortions, etc. This clipping or buzzing generated by the speaker may contain high frequency components not present in the original signal, e.g. non-linear distortion.

Mobile computing device 100 further comprises microphone 108 operative to receive the second signal from speaker 107 and provide the second signal to echo canceller 105. As shown in FIG. 1A, speaker 107 and microphone 108 may be located within speaker cavity 106 in various embodiments. Microphone 108 may, in various embodiments, be located outside of speaker cavity 106 and still fall within the embodiments described herein. For example, microphone 108 may be located outside speaker cavity 106 in a location selected to reduce the potential that echo or other linear distortion, other than non-linear distortion introduced by speaker 107, will be captured along with the first signal at microphone 108. Microphone 108 may comprise a secondary microphone in various embodiments.

Microphone 110 may comprise a primary microphone in some embodiments. Microphone 110 may be operative to receive a third signal and provide the third signal to echo canceller 105. The third signal may comprise the second signal and linear distortion, inaccuracy or echo introduced by an echo environment. The third signal may also include the voice signal of the user of mobile computing device 100. The voice signal is the signal that is to be reproduced and cleaned up by mobile computing device 100 in various embodiments.

Linear distortion may comprise a superposition or time-shifted and amplitude scaled version of the original signal. For example, linear distortion may comprise a delayed version of the original signal. An example of a type of linear distortion may comprise distortion introduced into an acoustic signal as a result of the signal traveling through an echo environment. For example, the third signal may comprise an acoustic version of the first signal, non-linear distortion introduced by speaker 107, linear distortion introduced by the echo environment in which mobile computing device 100 is being used, and the voice of a user of mobile computing device 100.

Echo canceller 105 is coupled to microphone 108 and microphone 110 in various embodiments. The echo canceller 105 may be operative to compare the second signal and the third signal and reduce distortion in the third signal based on the comparison. In various embodiments, the distortion reduced by echo canceller 105 may comprise non-linear distortion introduced by speaker 107.

By using secondary microphone 108 to capture the distorted output of speaker 107, mobile computing device 100 may avoid the use of non-linear echo cancellation algorithms in some embodiments. For example, secondary microphone 108 may capture the output of speaker 107, including clipping, buzzing or other non-linear distortion introduced by speaker 107, and mobile computing device 100 may use this signal to cancel or reduce non-linear distortion. For example, conventional linear echo cancellation techniques may be used to remove the clipping, buzzing or other non-linear speaker output from the signal received at the primary microphone 110 based on the signal captured by the secondary microphone 108.

In various embodiments, the second signal undergoes only linear distortion through the echo paths of the echo environment prior to being captured at the primary microphone 110. Comparing and reducing non-linear distortion based on the signal captured by the secondary microphone 108 may increase the accuracy of non-linear distortion reduction and avoid the need to use complex and often inaccurate non-linear echo cancellation algorithms in various embodiments. In this manner, mobile computing device 100 is capable of focusing on the linear distortion introduced by the echo environment without being burdened with complex non-linear distortion computations. Other embodiments are described and claimed.

In various embodiments, comparing the second signal and the third signal further comprises arranging a non-linear cancellation algorithm based on the comparison. The non-linear cancellation algorithm may be used to reduce non-linear distortion in the third signal in some embodiments. While a non-linear cancellation algorithm may be used in some embodiments, it should be understood that use of a non-linear cancellation algorithm is not required to fall within the embodiments described herein. The non-linear cancellation algorithm is further described with reference to FIG. 2 and the accompanying embodiments described in more detail below.

The first signal may optionally be sent to the echo canceller 105 in various embodiments. The first signal, comprising the electrical source signal, may be compared with the third signal at echo canceller 105 to reduce linear distortion or echo in the third signal. In some embodiments, comparing the first signal and the third signal further comprises arranging a linear echo cancellation algorithm based on the comparison and using the linear echo cancellation algorithm to reduce echo in the third signal. Other embodiments are described and claimed.

Figure 1B:
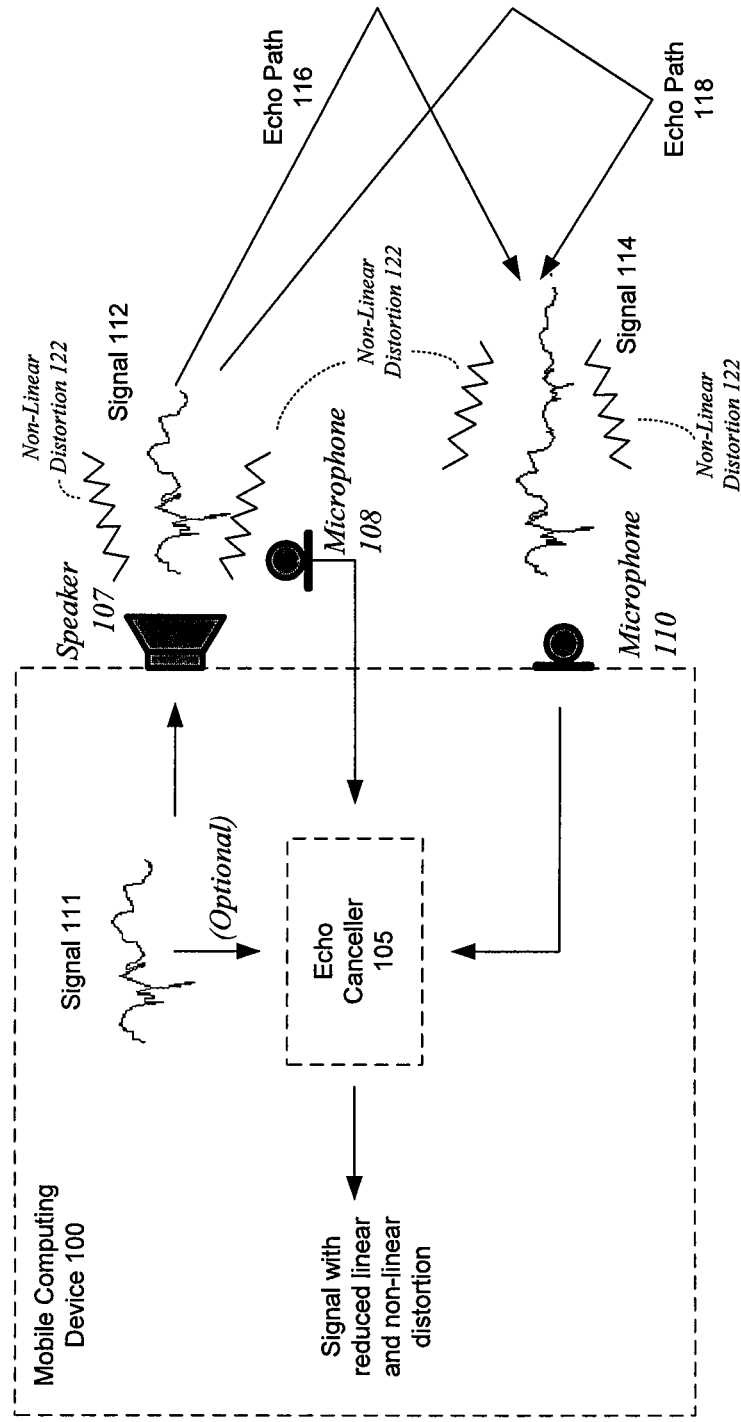
FIG. 1B illustrates one embodiment of a signal flow diagram.

FIG. 1B illustrates one embodiment of a signal flow diagram including mobile computing device 100. In particular, FIG. 1B shows an echo environment 120 including by way of example and not limitation mobile computing device 100, echo canceller 105, speaker 107, microphone 108, microphone 110, signal 111, signal 112, signal 114, echo path 116, echo path 118 and non-linear distortion 122. In various embodiments, the mobile computing device 100, echo canceller 105, speaker 107, microphone 108 and microphone 110 of FIG. 1B may be implemented as part of mobile computing device 100 of FIG. 1A. Other embodiments are described and claimed.

In various embodiments, signal 111 may comprise the electrical source signal or first signal as described with reference to FIG. 1A. Signal 111 may comprise the original audio source signal prior to conversion from an electrical signal to an acoustic signal by speaker 107 and prior to any distortion or echo being added to the signal.

Signal 111 is sent to speaker 107 for conversion from an electrical signal to an acoustic signal. In some embodiments, signal 111 is also sent to echo canceller 105 to assist in the reduction of linear echo cancellation. As illustrated in FIG. 1B, sending signal 111 to echo canceller 105 is optional and is not required to fall within the embodiments described herein.

In various embodiments, signal 112 comprises the output of speaker 107. Signal 112 comprises an acoustic version of signal 111 plus non-linear distortion 122. Non-linear distortion 122 may result from speaker 107 being overdrive, speaker 107 being inadequate to reproduce signal 111, or speaker 107 inaccurately reproducing signal 111. Signal 112 represents, in some embodiments, a signal that has not yet entered or been effected by echo environment 120 and has been effected only by speaker 107. Signal 112 is captured by microphone 108 and is sent to echo canceller 105 in various embodiments.

Signal 112 enters the echo environment 120 and travels along at least one echo path 116, 118. Echo environment 120 may comprise any environment in which a mobile computing device could be operated. For example, echo environment 120 may comprise the inside of an automobile, the outdoors, indoors with exposed brick walls or other reflecting surfaces, an auditorium, etc. The acoustic characteristics of the echo environment will differ from echo environment to echo environment. As a result, echo paths 116 and 118 will differ in each respective echo environment and when mobile computing device is utilized in different configurations or locations in each echo environment. While only two echo paths 116, 118 are shown by way of example, it should be understood that any number of echo paths may exist for purposes of the described embodiments.

In various embodiments, signal 112 traverses echo environment 120 along a number of echo paths, such as echo paths 116 and 118 for example, and arrives at speaker 110 as signal 114. Signal 114 represents a transformed version of signal 112 that has been distorted in part as a result of echo environment 120 and the one or more echo paths over which it has traveled. Signal 114 is passed from microphone 110 to echo canceller 105 where it is compared with signal 112 to reduce the amount of non-linear distortion present in signal 114. In some embodiments, signal 114 is also compared with signal 111 at echo canceller 105 to reduce the amount of linear distortion present in signal 114. Echo canceller 105 then outputs a signal with reduced linear and non-linear distortion for further processing by mobile computing device 100. In some embodiments, signals 111, 112 and 114 may be compared at places other than at echo canceller 105 and still fall within the described embodiments.

The comparison performed at echo canceller 105 may be processed by any suitable form of signal processing such as by a digital signal processor (DSP) or a general purpose processor, for example. Because signals 111 and 112 are known to the echo canceller 105, the comparison or correlation of signals 111, 112 and 114 can occur quickly and can result in an accurate approximation of the distortion introduced by speaker 107 and the echo introduced by the echo environment 120. Based on the correlation, echo canceller 105 may output a signal with reduced linear and non-linear distortion for further processing by mobile computing device 100, the outputted signal accurately representing an approximation of the electrical source signal or a cleaned up version of the voice signal of a user of mobile computing device 100.

In various embodiments, signal 111 may comprise a known training sequence utilized by mobile computing device 100 to sound out echo environment 120 and to accurately determine the non-linear distortion introduced by speaker 107. The known training sequence may be selectively sent from mobile computing device 100 to speaker 107 during differing periods of activity and inactivity of the various components of mobile computing device 100. For example, there may be periods of inactivity during which no signals are being sent to the speaker 107 and no signals are being received at microphones 108 and 110. In some embodiments, activity may occur at speaker 107 only, at microphone 108 or microphone 110 only, or at both microphones 108 and 110. Any combination of the variety of activity levels is possible and the training sequence may be sent during any of the combination of activity levels, for example.

Figure 2:
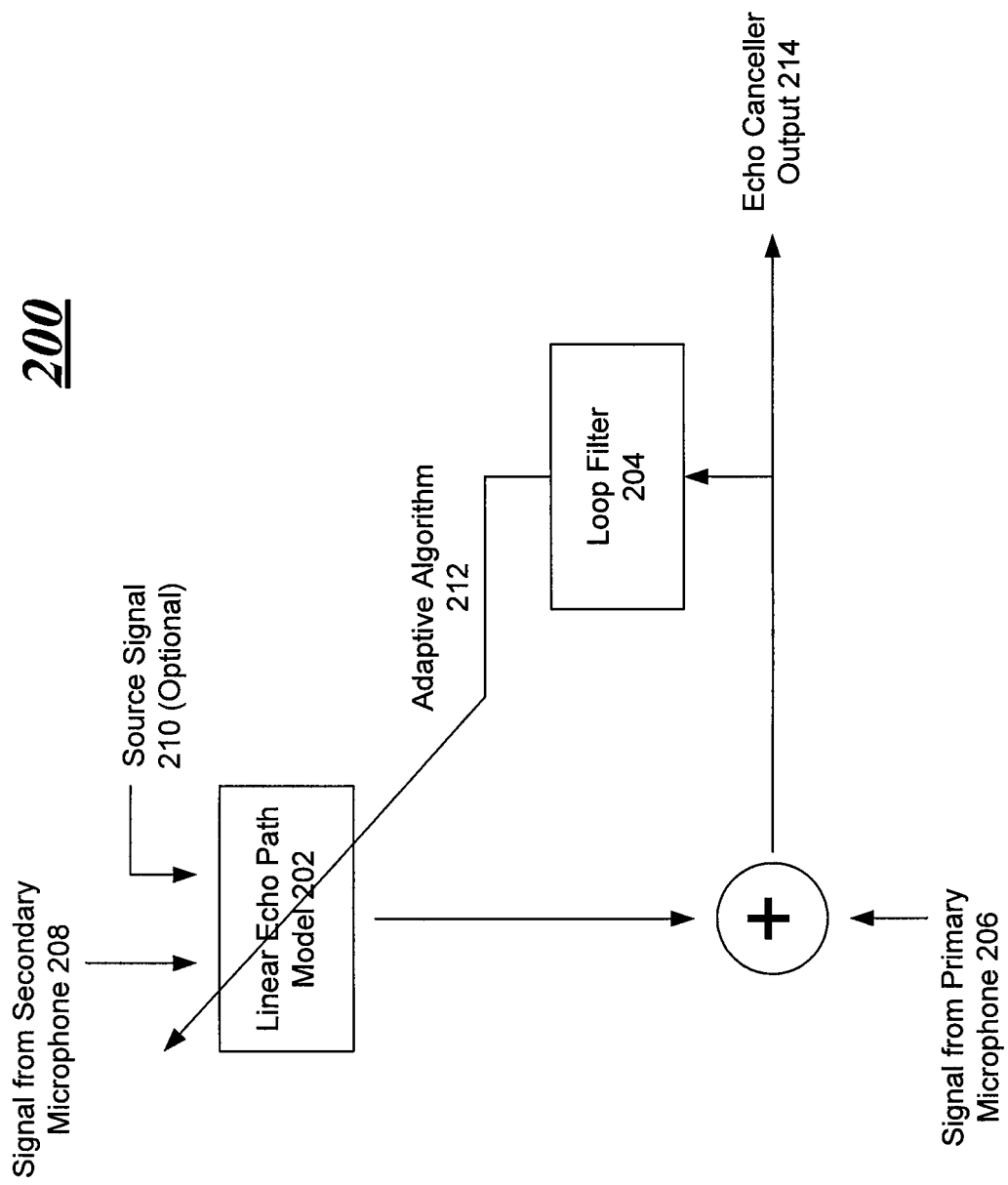
FIG. 2 illustrates one embodiment of an echo cancellation algorithm.

FIG. 2 illustrates an embodiment of an echo cancellation algorithm. In particular, FIG. 2 illustrates an echo cancellation algorithm 200 that may be representative of an echo cancellation algorithm utilized by an echo canceller, such as echo canceller 105 of FIGS. 1A and 1B, in various embodiments. The echo cancellation algorithm 200 may comprise any algorithm configured to anticipate the unwanted portions of the signal being received at microphone 110, e.g. the linear and non-linear distortion of signal 114, and cancel it or reduce the impact of those portions on the audio reproduction quality of the mobile computing device 100 of FIG. 1B, for example. In various embodiments, the output of the echo cancellation algorithm may be used to initialize parameters of the echo canceller or echo suppressor that is configured to produce a signal that is one hundred and eighty degrees out of phase with the correlated signal to eliminate or reduce the echo or distortion portion of the signal. Other embodiments are described and claimed.

As shown in FIG. 2, a signal from a primary microphone 206 may be combined with or compared to a signal from a secondary microphone 208. The combined signal or the result of the comparison may pass through loop filter 204 which outputs an adaptive algorithm 212. In some embodiments, a source signal 210 may optionally be combined with the signal from the primary microphone 206 in addition to the signal from the secondary microphone 208. Adaptive algorithm 212 may be used to enhance linear echo path model 202 to account for non-linear distortion detected in the combined signal.

In various embodiments, the signal from the primary microphone 206 may comprise signal 114 of FIG. 1B, the signal from the secondary microphone 208 may comprise signal 112 of FIG. 1B, and the source signal 210 may comprise signal 111 of FIG. 1B. By comparing signal 206 and signal 208, echo cancellation algorithm 200 may be adapted to account for non-linear distortion. Additionally, by optionally comparing signal 206 and signal 210, echo cancellation algorithm 200 may be adapted to account for linear distortion, such as echo introduced by an echo environment. While only one echo cancellation algorithm is shown by way of example, it should be understood that any suitable echo cancellation algorithm could be used and still fall within the scope of the described embodiments.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

Figure 3:
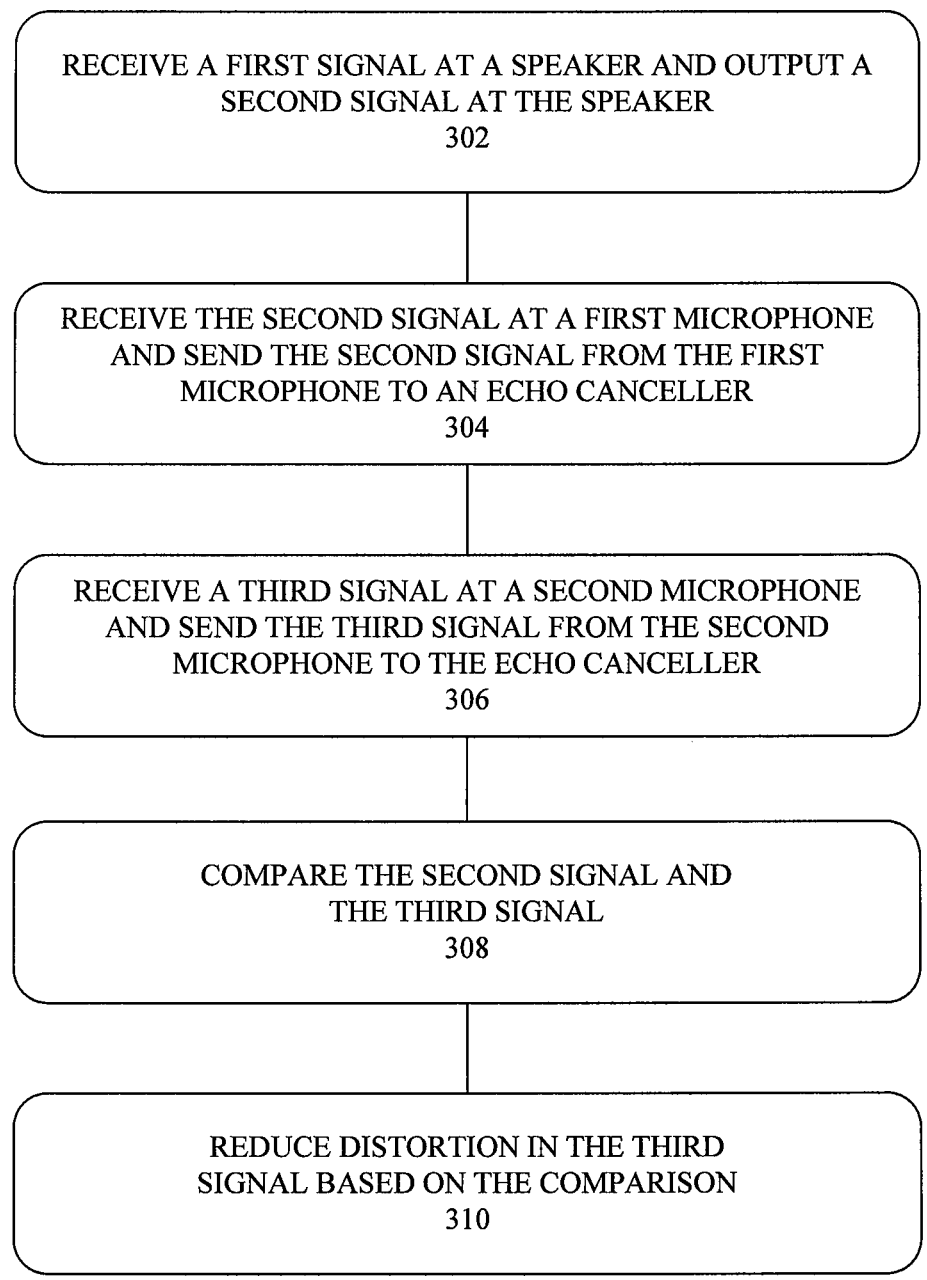
FIG. 3 illustrates one embodiment of a logic diagram.

FIG. 3 illustrates one embodiment of a logic diagram. In particular, FIG. 3 illustrates a logic diagram 300, which may be representative of the operations executed by one or more embodiments described herein. As shown in the FIG. 3, a first signal is received at a speaker and the speaker outputs a second signal at 302. For example, an electrical source signal, such as signal 111, may be received at speaker 107 in FIG. 1B and an acoustic signal may be output from speaker 107, such as signal 112 in FIG. 1B. In some embodiments, the second signal comprises an acoustic version of the first signal and distortion, inaccuracy or non-linearity introduced by the speaker.

At 304, the second signal is received at a first microphone and the second signal is sent from the first microphone to an echo canceller. For example, signal 112 may be received at microphone 108 in FIG. 1B and sent to echo canceller 105. At 306 a third signal may be received at a second microphone and the third signal may be sent from the second microphone to the echo canceller. For example, signal 114 may be received at microphone 110 and sent to echo canceller 105 in FIG. 1B. The third signal may comprise the second signal and distortion, inaccuracy or echo introduced by the echo environment in some embodiments.

The second signal and the third signal may be compared at 308 and distortion may be reduced in the third signal based on the comparison at 310. For example, echo canceller 105 may compare signals 112 and 114 in FIG. 1B and reduce distortion detected in signal 114 based on the comparison. In some embodiments, signals 112 and 114 may compared in mobile computing device 100 in places other than echo canceller 105. In various embodiments, the speaker and the first microphone may be located within a speaker cavity. For example, speaker 107 and microphone 108 may be located within speaker cavity 106 of FIG. 1A.

In one embodiment, the distortion reduced in the third signal may comprise non-linear distortion based on the comparison of the second and third signals. Non-linear distortion may comprise, for example, new or additional frequency components and phase shifts not present in the original signal. For example, if speaker 107 of FIG. 1B were overdriven by signal 111, the signal having an amplitude outside that range that speaker 107 were configured to accommodate, the resulting signal 112 could potentially include additional frequencies that were not present in signal 111, e.g. non-linear distortion.

In some embodiments, a non-linear cancellation algorithm may be arranged based on the comparison of the second signal and the third signal. For example, echo cancellation algorithm 200 of FIG. 2 may be configured based on the comparison of signals 206 and 208. The non-linear cancellation algorithm may be used to reduce non-linear distortion in the third signal in some embodiments. For example, non-linear distortion in signal 114 of FIG. 1B may be reduced using a non-linear echo cancellation algorithm, which may be executed by echo canceller 105 for example. It should be understood that various embodiments described herein include non-linear distortion reduction without the use of a non-linear echo cancellation algorithm, for example.

In various embodiments, the first signal may optionally be sent to the echo canceller and the first signal may be compared with the third signal to reduce linear distortion or echo in the third signal based on the comparison. Linear distortion may comprise superposition of time-shifted and amplitude scaled versions of the original signal. For example, linear distortion may comprise a delayed version of the original signal. An example of a type of linear distortion may comprise distortion introduced into an acoustic signal as a result of the signal traveling through an echo environment.

In some embodiments, a linear echo cancellation algorithm may be arranged based on the comparison of the first signal and the third signal and the linear echo cancellation algorithm may be used to reduce echo in the third signal. For example, signal 112 traverses echo paths 116 and 118 in FIG. 1B, resulting in linear distortion of signal 112 which is captured at microphone 110 as signal 114. Signal 114 may be compared with signal 111 to detect and reduce the linear distortion introduced by echo environment 120, for example. Other embodiments are described and claimed.

Figure 4:
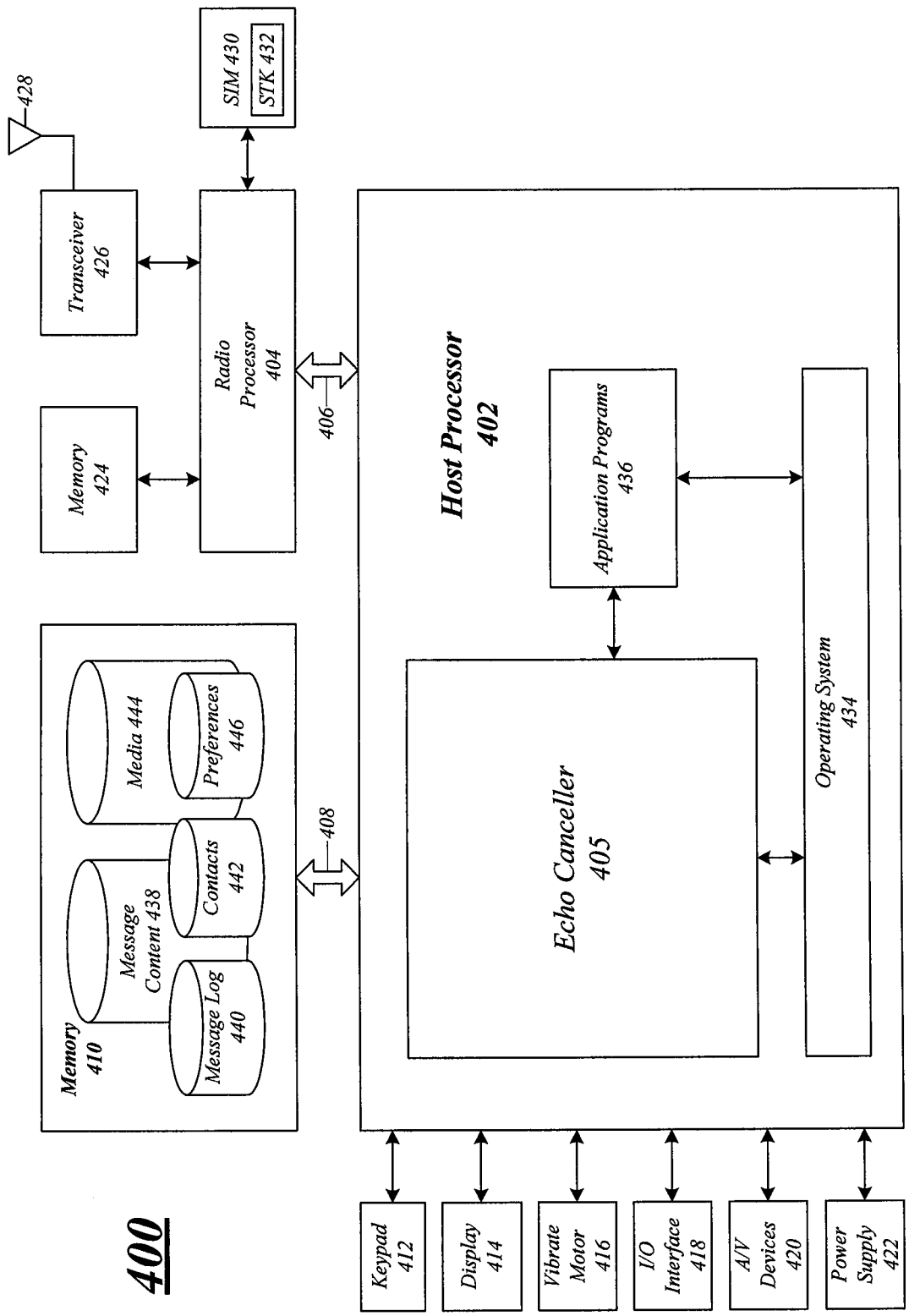
FIG. 4 illustrates one embodiment of a second mobile computing device.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 102) may be responsible for executing various software programs such as system programs and applications programs to provide computing and processing operations for the mobile computing device 400. The radio processor 404 may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alphanumeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and secure digital (SD) RAM. Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. System programs generally may assist in the running of the mobile computing device 400 and may be directly responsible for controlling, integrating, and managing the individual hardware components of the computer system. The OS 434 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include an echo canceller 405. The echo canceller 405 may be the same or similar to the echo canceller 105 described with reference to FIGS. 1A and 1B.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
   a speaker to receive a first signal and output a second signal;
   a first microphone to receive the second signal;
   a second microphone to receive a third signal;
   an echo canceller comprising an adaptive algorithm to couple with the first microphone and the second microphone, the echo canceller to compare the second signal and the third signal and generate the adaptive algorithm by passing a result of the comparison through a loop filter, the echo canceller to reduce non-linear distortion in the third signal based on the comparison and by utilizing the adaptive algorithm to enhance a linear echo path model to account for the non-linear distortion, the echo canceller to determine an acoustic echo environment and non-linear distortion created by the speaker by utilizing a known training sequence.

2. The mobile computing device of claim 1, the speaker and the first microphone located within a speaker cavity.

3. The mobile computing device of claim 1, the speaker to incidentally add non-linear distortion to the first signal when forming the second signal.

4. The mobile computing device of claim 1, the first signal sent to the echo canceller, the echo canceller to compare the first signal and the third signal and reduce linear distortion or echo in the third signal based on the comparison of the first signal and third signal.

5. The mobile computing device of claim 4, the comparing the first signal and the third signal further comprising arranging a linear echo cancellation algorithm based on the comparison of the first signal and the third signal and using the linear echo cancellation algorithm to reduce echo in the third signal.

6. The mobile computing device of claim 1, the second signal comprising an acoustic version of the first signal and distortion, inaccuracy or non-linearity introduced by the speaker.

7. The mobile computing device of claim 1, the third signal comprising the second signal and distortion, inaccuracy or echo introduced by an echo environment.

8. A method, comprising:
   receiving a first signal at a speaker and outputting a second signal at the speaker;
   receiving the second signal at a first microphone and sending the second signal from the first microphone to an echo canceller including an adaptive algorithm;
   receiving a third signal at a second microphone and sending the third signal from the second microphone to the echo canceller;
   comparing the second signal and the third signal;
   generating the adaptive algorithm by passing a result of the comparison through a loop filter;
   reducing non-linear distortion in the third signal based on the comparison;
   utilizing the adaptive algorithm to enhance a linear echo path model to account for the non-linear distortion; and
   determining an acoustic echo environment and non-linear distortion created by the speaker by utilizing a known training sequence.

9. The method of claim 8, the speaker and the first microphone located within a speaker cavity.

10. The method claim 8, further comprising:
    sending the first signal to the echo canceller;
    comparing the first signal and the third signal; and
    reducing linear distortion or echo in the third signal based on the comparison of the first signal and third signal.

11. The method of claim 10, further comprising:
    arranging a linear echo cancellation algorithm based on the comparison of the first signal and the third signal; and
    using the linear echo cancellation algorithm to reduce echo in the third signal.

12. The method of claim 8, the second signal comprising an acoustic version of the first signal and distortion, inaccuracy or non-linearity introduced by the speaker.

13. The method of claim 8, the third signal comprising the second signal and distortion, inaccuracy or echo introduced by an echo environment.

14. An article comprising a storage medium containing instructions that when executed enable a system to:
    receive a first signal at a speaker and output a second signal at the speaker;
    receive the second signal at a first microphone and send the second signal from the first microphone to an echo canceller, the echo canceller including an adaptive algorithm;
    receive a third signal at a second microphone and send the third signal from the second microphone to the echo canceller;
    compare the second signal and the third signal;
    generate the adaptive algorithm by passing the result of the comparison through a loop filter;
    reduce non-linear distortion in the third signal based on the comparison;
    utilize the adaptive algorithm to enhance a linear echo path model to account for the non-linear distortion; and
    determine an acoustic echo environment and non-linear distortion created by the speaker by utilizing a known training sequence.

15. The article of claim 14, the speaker and the first microphone located within a speaker cavity.

16. The article of claim 14, further comprising instructions that when executed enable the system to:
- send the first signal to the echo canceller;
- compare the first signal and the third signal; and
- reduce linear distortion or echo in the third signal based on the comparison of the first signal and the third signal.

17. The article of claim 16, further comprising instructions that when executed enable the system to:
- arrange a linear echo cancellation algorithm based on the comparison of the first signal and the third signal; and
- use the linear echo cancellation algorithm to reduce echo in the third signal.

18. The article of claim 14, the second signal comprising an acoustic version of the first signal and distortion, inaccuracy or non-linearity introduced by the speaker.

19. The article of claim 14, the third signal comprising the second signal and distortion, inaccuracy or echo introduced by an echo environment.

* * * * *